(12) United States Patent
Choi et al.

(10) Patent No.: US 11,557,089 B1
(45) Date of Patent: Jan. 17, 2023

(54) SYSTEM AND METHOD FOR DETERMINING A VIEWPOINT OF A TRAFFIC CAMERA

(71) Applicant: VALERANN LTD., Tel Aviv (IL)

(72) Inventors: Tsz Hei Choi, London (GB); Ran Katzir, London (GB); Jacob Guy Rainbow, London (GB)

(73) Assignee: VALERANN LTD, Tel Aviv (IL)

( * ) Notice: Subject to any disclaimer, the term of this patent is extended or adjusted under 35 U.S.C. 154(b) by 0 days.

(21) Appl. No.: 17/704,821

(22) Filed: Mar. 25, 2022

(51) Int. Cl.
| | |
|---|---|
| *G06T 17/05* | (2011.01) |
| *G06T 7/70* | (2017.01) |
| *G06T 7/11* | (2017.01) |
| *G08G 1/017* | (2006.01) |
| *G06V 20/54* | (2022.01) |

(52) U.S. Cl.
CPC ............. *G06T 17/05* (2013.01); *G06T 7/11* (2017.01); *G06T 7/70* (2017.01); *G06V 20/54* (2022.01); *G08G 1/017* (2013.01); *G06T 2207/10028* (2013.01); *G06T 2207/30232* (2013.01); *G06T 2207/30236* (2013.01); *G06T 2207/30241* (2013.01); *G06T 2207/30252* (2013.01)

(58) Field of Classification Search
CPC ...... G06V 20/588; G06V 20/56; G06V 20/54; G06T 7/70; G06T 7/75
See application file for complete search history.

(56) References Cited

U.S. PATENT DOCUMENTS

| | | | |
|---|---|---|---|
| 9,092,853 B2 | 7/2015 | Sachs et al. | |
| 2012/0044355 A1* | 2/2012 | Jamtgaard | G01S 5/00 |
| | | | 348/E7.086 |
| 2018/0342080 A1* | 11/2018 | Maddern | G06T 17/05 |
| 2019/0266418 A1* | 8/2019 | Xu | G06V 10/457 |
| 2021/0058608 A1 | 2/2021 | Jung et al. | |
| 2021/0327084 A1* | 10/2021 | Ivanov | G06V 20/588 |

FOREIGN PATENT DOCUMENTS

EP   3193306   7/2017

OTHER PUBLICATIONS

Kastrinaki, V., Michalis Zervakis, and Kostas Kalaitzakis. "A survey of video processing techniques for traffic applications." Image and vision computing 21.4 (2003): 359-381. (Year: 2003).*
Dubska et al; Automatic Camera Calibration for traffic Understanding: http://www.bmva.org/bmvc/2014/files/paper013.pdf, printed on Mar. 20, 2022.

* cited by examiner

*Primary Examiner* — Ryan McCulley
(74) *Attorney, Agent, or Firm* — Pearl Cohen Zedek Latzer Baratz LLP

(57) ABSTRACT

A system and method for determining a viewpoint of a traffic camera includes obtaining images of a real road captured by the traffic camera, segmenting a road surface from the captured images to generate a mask of the real road, generating a 3D model of a simulated road corresponding to the real road, from geographical data of the real road, adding a simulated camera corresponding to the traffic camera to a location in the 3D model that is corresponding to a location of the traffic camera in the real road, generating a plurality of simulated images of the simulated road using the 3D model, each corresponding to a set of viewpoint parameters of the simulated traffic camera, selecting the simulated image that provides the best fit between the simulated image and the mask, and generating mapping between pixel locations in the captured images and locations on the real road.

19 Claims, 11 Drawing Sheets

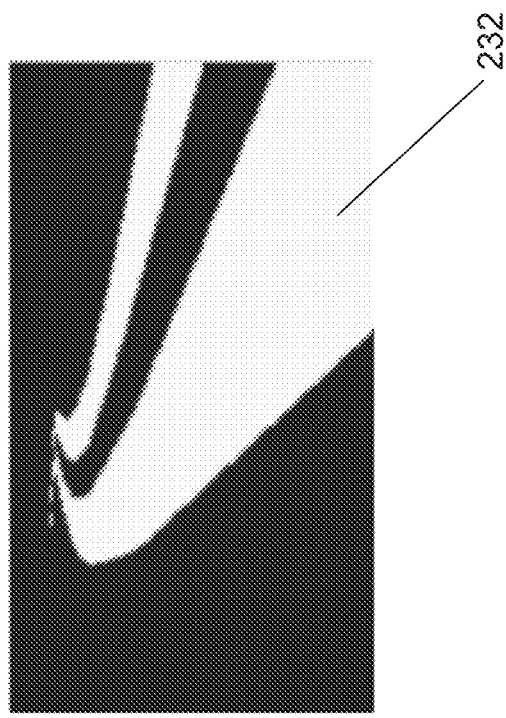
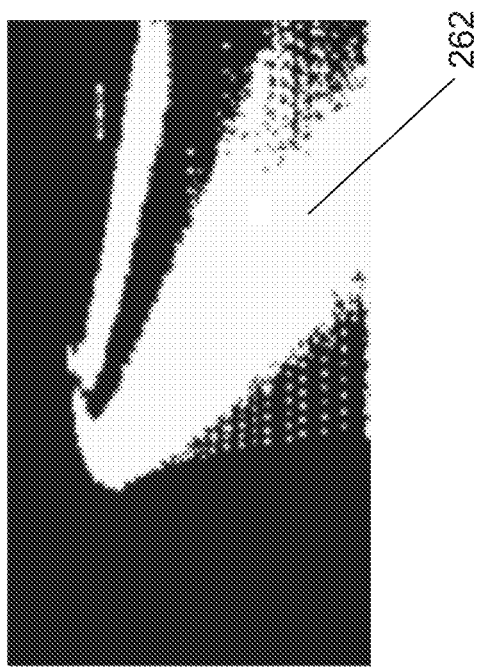
Fig. 6

SYSTEM AND METHOD FOR DETERMINING A VIEWPOINT OF A TRAFFIC CAMERA

FIELD OF THE INVENTION

The present invention relates generally to traffic cameras and more specifically, to estimating a viewpoint of a traffic camera.

BACKGROUND OF THE INVENTION

A traffic camera may include a video camera that may capture vehicular, pedestrians or rails traffic. Traffic cameras may be installed along roads such as highways, freeways, expressways and arterial roads, or next to sidewalks and rails. The traffic camera may provide live video in real-time to a control center. Traffic cameras may enable a wealth of intelligent transportation system (ITS) traffic management solutions. For example, an ITS may provide, using the live video provided by traffic cameras, automatic detection of incidents such as car accidents and stopped vehicles.

SUMMARY OF THE INVENTION

A computer-based system and method for determining a viewpoint of a traffic camera may include: obtaining, by a processor, images of a real road captured by the traffic camera; segmenting, by the processor, a road surface from the captured images to generate a mask of the real road; generating, by the processor, a three-dimensional (3D) model of a simulated road corresponding to the real road, from geographical data of the real road; adding, by the processor, a simulated camera corresponding to the traffic camera to a location in the 3D model that is corresponding to a location of the traffic camera in the real road; generating, by the processor, a plurality of simulated images of the simulated road using the 3D model, where each of the plurality of simulated images may correspond to a set of viewpoint parameters of the simulated traffic camera; selecting, by the processor, the simulated image that provides the best fit between the simulated image and the mask; and generating, by the processor, mapping between pixel locations in the captured images and locations on the real road.

According to embodiments of the invention, the viewpoint parameters may include at least one of field of view (FOV), height, pan, tilt, roll, lens distortion in direction X, lens distortion in direction Y, or a type of lens distortion.

According to embodiments of the invention, fitting the simulated image of the plurality of simulated images with the mask may include selecting the simulated image that provides a minimal loss function between the simulated image and the mask.

According to embodiments of the invention, minimizing the loss function may include: limiting the search space to a range of plausible values of the viewpoint parameters; performing a brute force evaluation on a coarse grid for at least a subgroup of the viewpoint parameters; selecting a number of parameter value combinations that provided results in a predetermined percentile; and searching in a finer grid around the selected parameter value combinations.

According to embodiments of the invention, segmenting the road surface may include: using an object detector to detect vehicles in the captured images; estimating positions in the captured images where the detected vehicles touch the real road; accumulating the positions over time; and determining the segments of the real road on the captured images based on the accumulated positions.

According to embodiments of the invention, correcting lens distortion may include: applying at least one type of a simulated lens distortion on the simulated image prior to performing the fitting; and selecting the type of lens distortion that provides the best fit.

According to embodiments of the invention, generating the mapping for a pixel location may include: projecting the pixel forward in the 3D model until the projection intersects with a simulated ground plane; and computing coordinates of the intersection and associating the coordinates of the intersection with the pixel.

Embodiments of the invention may include using the mapping to perform at least one of: determining a real-world location of an object depicted in an image captured by the traffic camera; determining a location in an image captured by the traffic camera of an object in the real world; generating and presenting, on the 3D model, a trajectory of a vehicle detected in consecutive images captured by the traffic camera; determining coverage of the traffic camera; determining a location in an image captured by the traffic camera of an object captured in an image of a second traffic camera; and projecting live video captured by the traffic camera on a map of the real road so that coordinate systems of the live video and the map are aligned.

Embodiments of the invention may include: repeating generating the mapping for a plurality of traffic cameras; determining coverage of the plurality of traffic cameras; and selecting a camera from the plurality of traffic cameras that provides the best view of a point of interest.

Embodiments of the invention may include simulating an optimal location for a new traffic camera that would maximize coverage.

According to embodiments of the invention, the traffic camera may be one of: a static camera, a pan-tilt-zoom (PTZ) camera, a panoramic camera or a thermal camera.

BRIEF DESCRIPTION OF THE DRAWINGS

Non-limiting examples of embodiments of the disclosure are described below with reference to figures listed below. The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanying drawings.

FIG. 6 depicts a comparison of simulated images and a mask, according to some embodiments of the invention.

Figure 1:
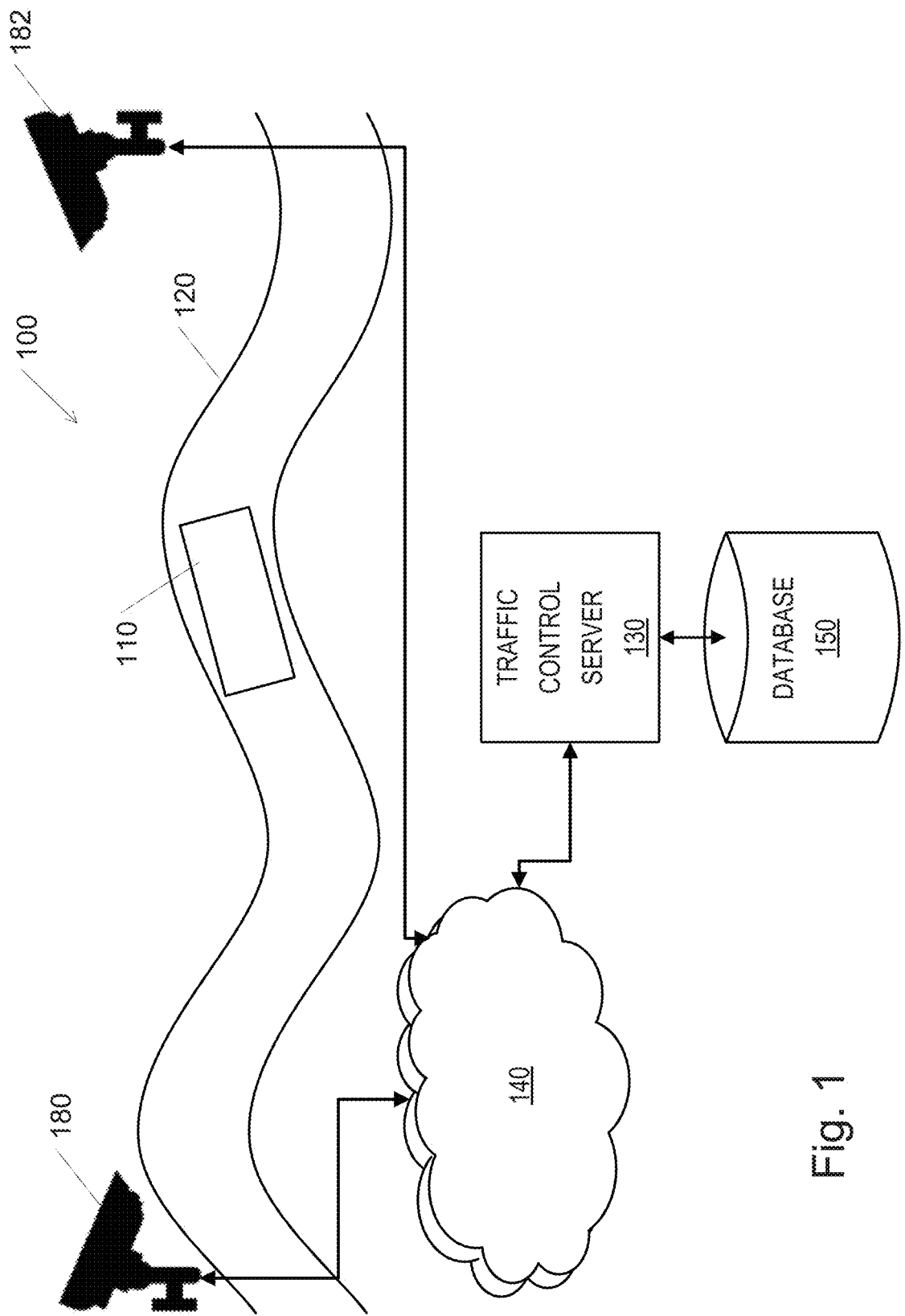
FIG. 1 depicts a system for traffic monitoring, according to some embodiments of the invention.

It will be appreciated that, for simplicity and clarity of illustration, elements shown in the figures have not necessarily been drawn accurately or to scale. For example, the dimensions of some of the elements may be exaggerated relative to other elements for clarity, or several physical components may be included in one functional block or element. Reference numerals may be repeated among the figures to indicate corresponding or analogous elements.

DETAILED DESCRIPTION OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, and components, modules, units and/or circuits have not been described in detail so as not to obscure the invention. For the sake of clarity, discussion of same or similar features or elements may not be repeated.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions to perform operations and/or processes. Although embodiments of the invention are not limited in this regard, the terms "plurality" and "a plurality" as used herein may include, for example, "multiple" or "two or more". The term set when used herein may include one or more items. Unless explicitly stated, the method embodiments described herein are not constrained to a particular order or sequence. Additionally, some of the described method embodiments or elements thereof can occur or be performed simultaneously, at the same point in time, or concurrently.

A traffic camera may include a video camera that may capture vehicular, pedestrian or rail trains traffic. Traffic cameras may include closed-circuit television cameras, CCTV cameras, automatic number plate recognition (ANPR) cameras, Internet protocol (IP) cameras, pan tilt zoom (PTZ) cameras, panoramic cameras, infra-red cameras, etc. Some traffic cameras may be stationary, while others, such as the PTZ cameras, may pan and tilt and enable zooming in and out to provide wide-area coverage.

Traffic cameras may be installed along roads such as highways, freeways, expressways and arterial roads, or next to sidewalks and rail and may provide live video in real-time to a control center. The live video provided by traffic cameras may enable providing a variety of ITS traffic management applications. However, to derive meaningful information from computer vision algorithms, cameras must first be calibrated, meaning that the mapping between pixel coordinates and physical road surface coordinates must be established. This presents a challenge as cameras may rotate, pan zoom in or zoom out intentionally, in the case of PTZ enabled cameras, and unintentionally, for example due to wind gusts. For PTZ-enabled cameras, having access to live orientation values is often challenging due to technical and cybersecurity reasons. Even if these values are accessible, they may not be well calibrated to the precision necessary for computer vision algorithms. As such, there is a need for an algorithm to perform calibration that does not assume access to information related to the camera's orientation, model, and optics of the traffic cameras.

Accurate viewpoint estimation is essential, as it may allow the location of incidents detected via any vision algorithm to be more accurately pinned point on a map; this is critical for traffic incident monitoring as further rules can be applied, based on the exact location of the incident. Accurate viewpoint estimation may also enable cameras to be more precisely oriented and maneuvered to point towards specific parts of the road; this is critical for traffic incident management.

Embodiments of the invention may improve the technology of ITS by providing a viewpoint model of traffic cameras used for transport system monitoring. The viewpoint model may allow automatic two-way conversion between the image coordinate system (e.g., pixels) and geospatial coordinate system, (e.g., longitudes and latitudes, or meters from camera, or linear referencing system). This automatic two-way conversion may enable determining a real-world location of an object depicted in an image captured by the traffic camera, determining a location in an image captured by the traffic camera of an object in the real world, generating and presenting a trajectory of a vehicle detected in consecutive images captured by the traffic camera, determining coverage of the traffic camera, determining a location in an image captured by the traffic camera of an object captured in an image of a second traffic camera, projecting live video captured by the traffic camera on a map of the real road so that coordinate systems of the live video and the map are aligned, and other functionalities as disclosed herein.

Embodiments of the invention may provide a system and method for determining or estimating a viewpoint of a traffic camera by obtaining images of a real road captured by the traffic camera, segmenting a road surface from the captured images to generate a mask of the real road, generating a three-dimensional (3D) model of a simulated road corresponding to the real road from geographical data (e.g., map data) of the real road, adding a simulated camera corresponding to the traffic camera to a location in the 3D model that is corresponding to a location of the traffic camera in the real road, generating a plurality of simulated images of the simulated road using the 3D model, where each of the plurality of simulated images may correspond to a set of viewpoint parameters of the simulated traffic camera, selecting the simulated image that provides the best fit between the simulated image and the mask, and generating mapping between pixel locations in the captured images and locations on the real road.

While embodiments of the invention are presented mainly with reference to traffic of vehicles, this is an example only, and embodiments of the invention may be implemented for finding a viewpoint of any traffic camera, for monitoring traffic of vehicles, trains or pedestrians through an area or along an expected predetermined route.

Embodiments of the invention may provide high scalability to support hundreds of traffic cameras or more, may work with static cameras, as well as with PTZ cameras which we may or may not have access to the PTZ values, and with various camera models, optics and lens distortions. Embodiments of the invention may enable automatic deployment to any new road as long as a computerized map data of the road is available. Embodiments of the invention may further account for elevation, occlusion and curvature of the earth. For example, the curvature of the earth may be included in the geographical data used to build the 3D model, and if the geographical data implies that some road segments are hidden from the camera, this may be added to the 3D model.

Reference is now made to FIG. 1 which depicts a system 100 for traffic monitoring, according to some embodiments of the invention. According to one embodiment of the invention, system 100 may include traffic cameras 180 and 182 that are connected to traffic control server 130, e.g., of a traffic control centre, over networks 140. Traffic cameras 180 and 182 may capture images of a real-world road, way, path or route 120. A vehicle 110 moving along real road 120 may be captured by one or both traffic cameras 180 and 182, depending on the location of vehicle 110 with relation to the field of view (FOV) of cameras 180 and 182. Traffic cameras 180 and 182 may provide a video stream including the captured images to traffic control server 130 over networks 140. While only two traffic cameras are depicted in FIG. 1, this is for demonstration purposes only, and system 100 may support hundreds and more traffic cameras.

Each of traffic cameras 180 and 182 may be a static camera, a PTZ camera, a CCTV camera, an ANPR camera, an IP camera, a panoramic camera, a thermal camera, etc. Each of traffic cameras 180 and 182 may be positioned to capture images of road 120. Some of traffic cameras 180 and 182 may be controlled to change their FOV, e.g., using the tilt, pan and/or zoom functionalities that some of those cameras may include. Each of traffic cameras 180 and 182 may include a wired or wireless network interface for connecting to network 140.

Network 140 may include any type of network or combination of networks available for supporting communication between traffic cameras 180 and 182 and traffic control server 130. Network 140 may include, for example, a wired, wireless, fiber optic, cellular, satellite or any other type of connection, a local area network (LAN), a wide area network (WAN), the Internet and intranet networks, etc.

Figure 13:
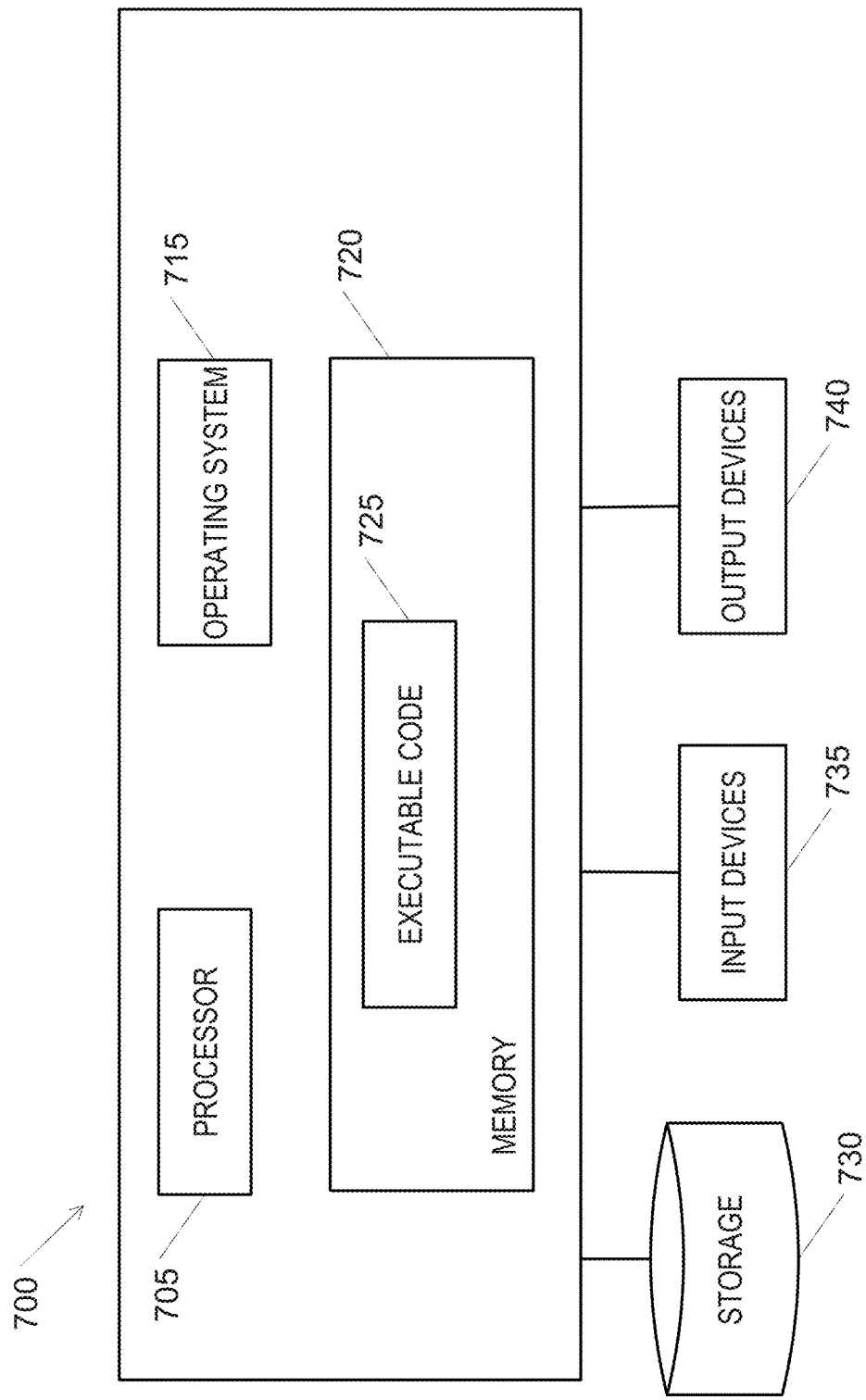
FIG. 13 shows a high-level block diagram of an exemplary computing device according to some embodiments of the present invention.

Each of traffic control server 130 and traffic cameras 180 and 182 may be or may include a computing device, such as computing device 700 depicted in FIG. 13. One or more databases 150 may be or may include a storage device, such as storage device 730. Traffic control server 130 and database 150 may communicate directly or over networks 140. In some embodiments, traffic control server 130 and database 150 may be implemented in a remote location, e.g., in a 'cloud' computing system.

According to some embodiments of the invention, traffic control server 130 may store in database 150 data obtained from traffic cameras 180 and 182 and other data, such as geographical information system (GIS) data, mapping of road 120 and surrounding area, 3D models of road 120, and any other data as required by the application. According to some embodiments of the invention, traffic control server 130 may be configured to obtain images of a real road 120 captured by traffic camera 180, segment a road surface from the captured images to generate a mask of the real road, generate a 3D model of a simulated road corresponding to the real road, from a map data of the real road, add a simulated camera corresponding to traffic camera 180 to a location in the 3D model that is corresponding to a location of the traffic camera 180 in the real road, generate a plurality of simulated images of the simulated road using the 3D model, where each of the plurality of simulated images corresponds to a set of viewpoint parameters of the simulated traffic camera, selecting the simulated image that provides the best fit between the simulated image and the mask, and generate a mapping between pixel locations in the captured images and locations on the real road 120.

Figure 2:
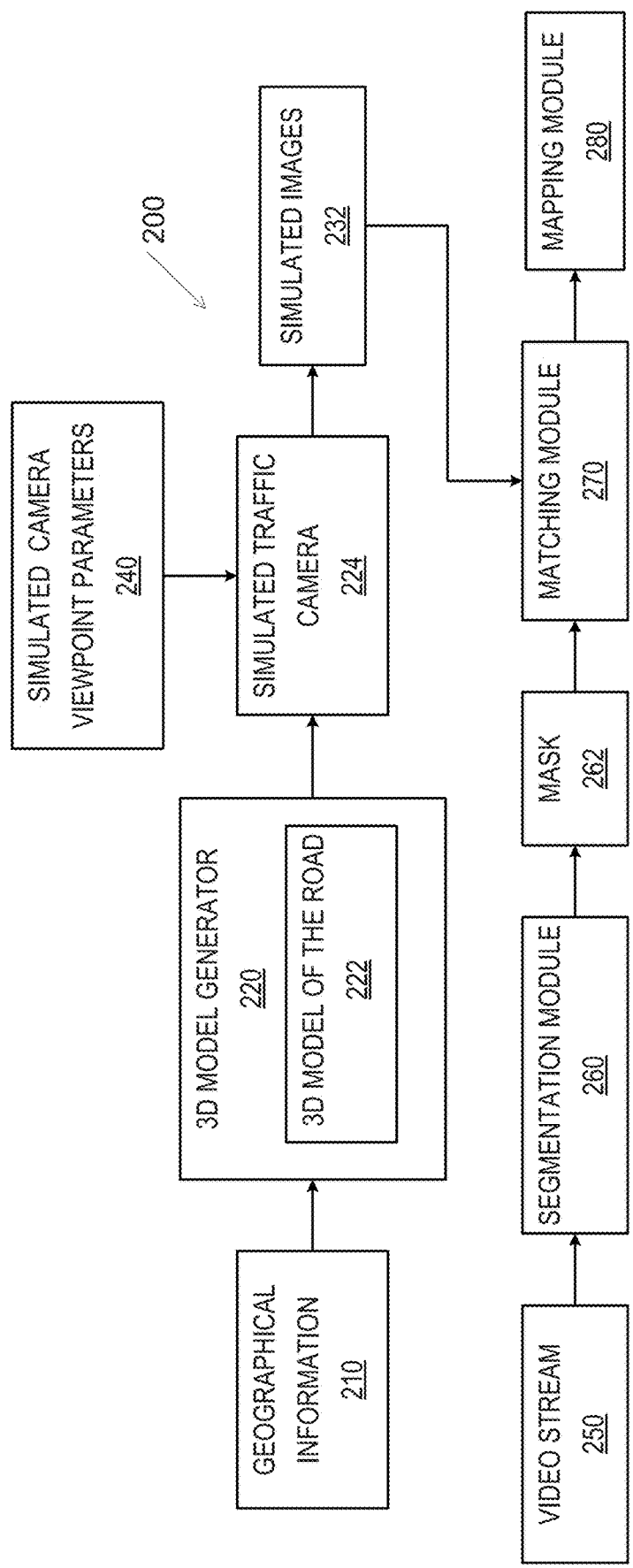
FIG. 2 depicts a system for determining a viewpoint of a traffic camera, according to some embodiments of the invention.

Reference is now made to FIG. 2 which depicts a system 200 for determining a viewpoint of a traffic camera, according to some embodiments of the invention. According to one embodiment of the invention, system 200 may be implemented by a processor, e.g., traffic control server 130 depicted in FIG. 1 and computing device 700 depicted in FIG. 13, or by another system.

According to one embodiment of the invention, system 200 may obtain a video stream 250, e.g., captured by traffic camera 180. Video stream 250 may be processed to extract metadata such as the time an image (e.g., an image from the video stream) was taken, e.g., traffic control server 130 may extract the time from the watermark timestamp on the image using for example an optical character recognition (OCR). In cases where the PTZ values are also watermarked, traffic control server 130 may extract the PTZ values as well using the OCR. However, this is not mandatory.

Segmentation module 260 may obtain images from video stream 250 and may segment a road surface from the images, e.g., to identify the image region that is part of the road surface. Segmentation module 260 may generate a mask 262 indicative of the image region that is part of the road surface and thus representing the real road. Segmentation module 260 may apply any applicable segmentation method to segment the read in the images. For example, segmentation may be performed using object detection, using semantic segmentation techniques, texture, shapes and color in the images, in combination with rules (e.g., sky is up, road is down, etc.), or any combination thereof.

According to some embodiments, segmentation module 260 may segment the road surface by detecting vehicles in the images, e.g., using object detection techniques. Object detection may be performed using any applicable method, including, for example, using a deep neural network (NN) trained to detect vehicles, an optical flow, etc. An example of a NN based object detector for vehicles may be the "you only look once" (YOLO) algorithm, which is a state-of-the-art, real-time object detection system that may be executed on real-time video streams. For example, YOLO may be trained with the COCO80 dataset to detect vehicles such as cars, trucks, motorcycles, buses, etc. Segmentation module 260 may be adapted to detect other objects, depending on the application. For example, segmentation module 260 may be adapted to detect pedestrians for implementing embodiments of the invention for detecting pavements, or trains for trains traffic management. Both YOLO and COCO80 are open-source packages.

Figure 3:
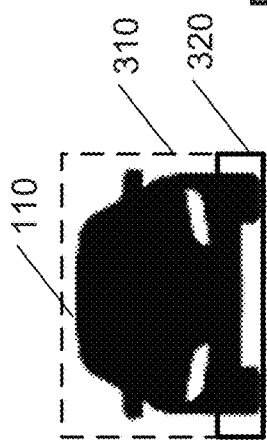
FIG. 3 depicts an example of a bounding box and estimation of the positions in the image where the vehicle touches the road, according to some embodiments of the invention.

The object detector may provide as output bounding boxes of the detected vehicles. According to embodiments of the invention, segmentation module 260 may estimate the positions in the image where the vehicles touch the road using those bounding boxes. For example, segmentation module 260 may estimate the positions in the image where the vehicles touch the road to be the middle bottom of the bounding box. According to some embodiments, each vehicle on each image may output one location in the image. FIG. 3 depicts an example of a bounding box and estimation of the positions in the image where vehicle 110 touches the road, according to some embodiments of the invention. Vehicle 110 was captured by traffic camera 180 and detected by segmentation module 260. Segmentation module 260 may provide bounding box 310 surrounding vehicle 110 in the image. Segmentation module 260 may estimate the positions in the image where vehicle 110 touches the road, e.g., positions that are likely to represent a road surface, to be the middle bottom of the bounding box, e.g., road box 320.

Figure 4:
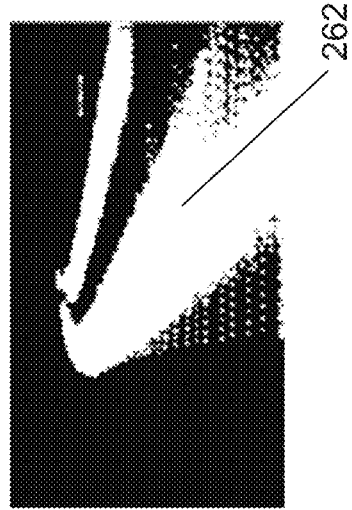
FIG. 4 depicts an example of a Boolean mask that was generated based on accumulated locations, according to some embodiments of the invention.

Segmentation module 260 may further extract other parameters from the images such as the direction of travel (e.g., by following vehicle 110 over consecutive images), the class of the vehicle, the size of the vehicle, etc. Segmentation module 260 may accumulate the positions and other parameters over time, and over a plurality of vehicles. Assuming the vehicles drive along road 120, segmentation module 260 may segment the images and determine segments of the real road on the captured images based on the accumulated detected positions and other parameters such as the motion vector (e.g., the read driving direction in a road or a lane), bounding box sizes and dimension. For example, segmentation module 260 may generate a Boolean mask 262, where pixels with at least a few detections (e.g., pixels that are included in a number of road boxes that is above a threshold) are true and are otherwise false. The threshold may be tuned, for example the threshold may be 3, 4, 5 or other numbers. FIG. 4 depicts an example of a Boolean mask 262 that was generated by segmentation module 260 based on the accumulated detected positions, according to some embodiments of the invention. As can be seen, Boolean mask 262 clearly shows sections of the image that contains two carriageways that are part of road 120.

According to one embodiment of the invention, system 200 may obtain geographical information 210 of road 120 e.g., map data or a digital map of the same road 120 depicted by traffic camera 180. 3D model generator 220 may obtain geographical information 210 and generate, from geographical information 210, a 3D model of a simulated road 222 (also referred simply as simulated road 222) corresponding to real road 120, e.g., a digitally simulated version of physical road 120 and associated traffic camera system. Geographical information 210 may include, for example, GIS data, an open-source map data such as OpenStreetMap, or other digital mapping sources such as Google Maps®. For example, 3D model generator 220 may extract the line geometry of the road from geographical information 210, buffer them by the width of the road and place them in a 3D modelling engine. For example, open-source Three.js 3D modelling engine may be used. The line geometry of the road extracted from geographical information 210 may be placed into a virtual 3D model of the road 222 in a 1-to-1 scale.

Figure 5:
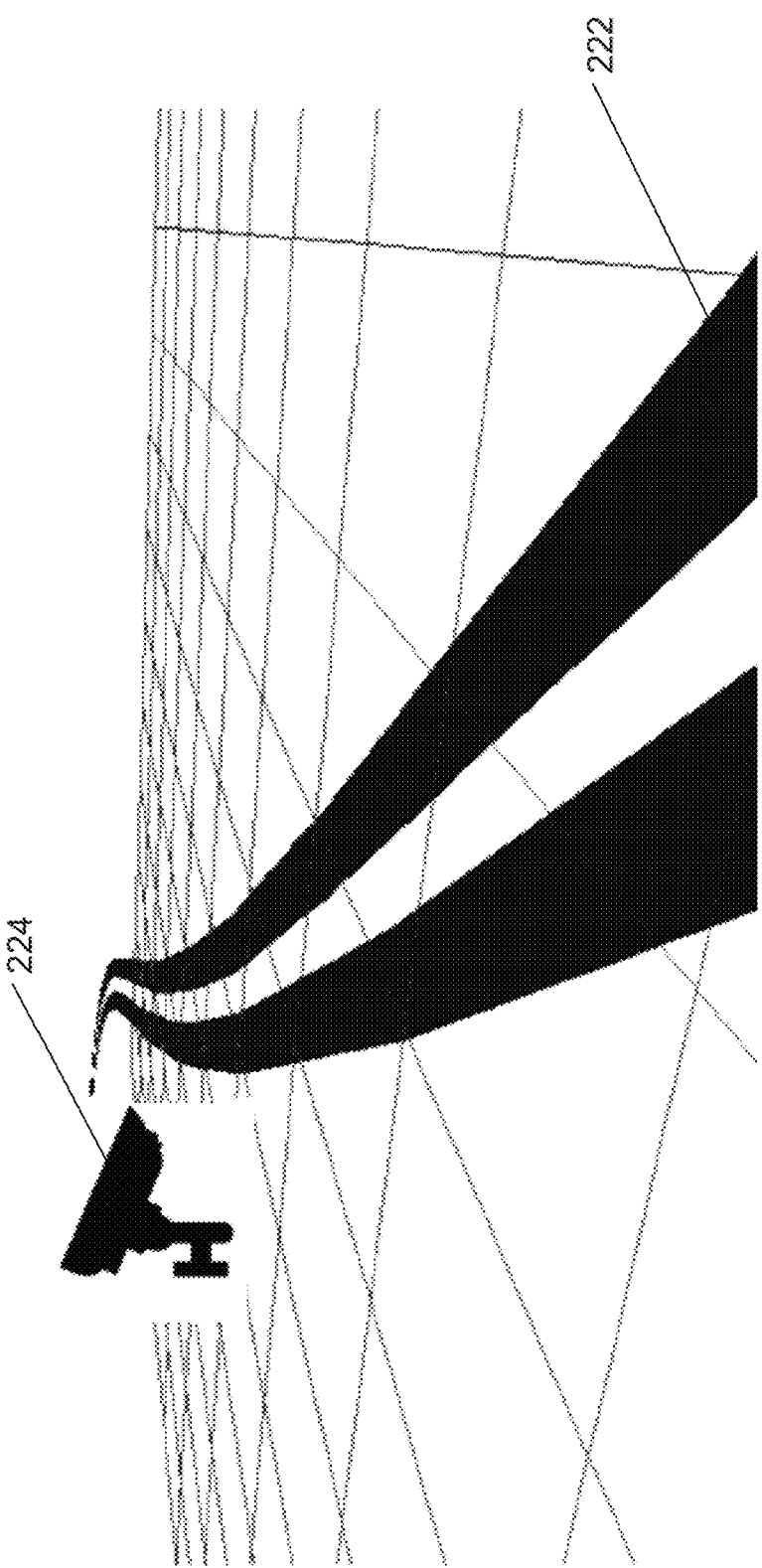
FIG. 5 depicts an example of a virtual 3D model of a road including a simulated traffic camera, according to some embodiments of the invention.

According to embodiments of the invention, 3D model generator 220 may further add a virtual or simulated traffic camera 224, e.g., a virtual or simulated perspective camera, to the 3D model of the road 222. Simulated or virtual traffic camera 224 may be added to the virtual 3D model of the road 222 in a location corresponding to the real-world location of traffic camera 180 (which is known, e.g., stored in database 150 presented in FIG. 1). For example, Three.js includes a built-in perspective camera, which may be added to the 3D model of the road 222. Simulated traffic camera 224 may be used as the basis for simulating traffic camera 180 in the virtual 3D model of the road 222. FIG. 5 depicts an example of virtual 3D model of the road 222 including simulated traffic camera 224, according to some embodiments of the invention. 3D model generator 220 may add simulated traffic camera 224 to the 3D model of the road 222 at the known location of traffic camera 180 but may leave other viewpoint parameters 240 of simulated traffic camera 224 variable. The viewpoint parameters 240 of simulated traffic camera 224 may include, for example, one or more of field of view (FOV), height, pan, tilt, roll, lens distortion in direction X, lens distortion in direction Y and a type of lens distortion.

According to embodiments of the invention, simulated traffic camera 224 may generate, based on the virtual 3D model of the road 222 and the viewpoint parameters 240 of simulated traffic camera 224, a plurality of simulated images 232 of the virtual 3D model of the road 222, where each of the plurality of simulated images 232 corresponds to a set of viewpoint parameters of the simulated traffic camera 224.

Table 1 presents a set of viewpoint parameters 240 and plausible values of the viewpoint parameters 240. According to embodiments of the invention simulated traffic camera 224 may generate simulated images 232 for different sets of the viewpoint parameters 240. For example, a first simulated image 232 may be generated for FOV=5°, height=5 m (meter), pan=20°, Tilt=0°, Roll=10°, lens distortion type=Equisoid, lens distortion in direction X=5, lens distortion in direction Y=5, a second simulated image 232 may be generated for FOV=10°, height=5 m (meter), pan=20°, Tilt=0°, Roll=10°, lens distortion in direction X=5 lens distortion in direction Y=5, etc. Table 1 is exemplary only, and other types and values of parameters may be used.

TABLE 1

A set of viewpoint parameters and plausible values.

| Parameter | Variability | Variable | Range |
|---|---|---|---|
| Field of View | Variable | Unknown but constant unless for PTZ cameras | 5° to 75°, nominally 15° |
| Height | Variable | Unknown but reasonably constant | 0 to 20, nominally 6 m |
| Pan | Variable | Unknown | 0° to 360° |
| Tilt | Variable | Unknown | −45° to 45° |
| Roll | Variable | Unknown | −15° to 15° |
| Lens Distortion Type | Variable | Unknown but reasonably constant | Equidistant, Orthographic, Stereographic or Equisoid |
| Lens Distortion in X ($\gamma_x$) | Variable | Unknown but reasonably constant | >=0 |
| Lens Distortion in Y ($\gamma_y$) | Variable | Unknown but reasonably constant | >=0 |

According to embodiments of the invention, when generating simulated images 232, simulated traffic camera 224 may account for various types of lens distortions such as fisheye distortion, barrel distortion, etc. According to some embodiments, simulated traffic camera 224 may apply a distortion on the simulated image 232 to generate a distorted versions of simulated image 232, as disclosed herein. For example, many traffic cameras have severe lens distortion, specifically fisheye distortion, to maintain a large field of view. Thus, to generate a simulated image that is similar to an image taken by traffic camera 180, generated image 232 (e.g., distortionless rendered images) should be intentionally distorted. For example, simulated traffic camera 224 may apply distortion equations on pixels of generated image 232 to generate distorted versions of generated image 232. According to embodiments of the invention, the type of distortion, as well as the intensity of the distortion, may be included in the viewpoint parameters of simulated traffic camera 224.

In one example, four types of distortion equations, e.g., equidistant, orthographic, stereographic and equisoid, each corresponding to a possible type of fisheye lens distortion are used. In cases where the type of lens distortion of traffic camera 180 is known, only equations that correspond to the known type of lens distortion may be used. For example, if it is known that traffic camera 180 has equidistant fisheye lens distortion, then only the equidistant distortion equations may be applied on generated image 232, and there is no need to apply other types of distortion equations on generated image 232.

The following distortion equations describe the relationship of pixel positions between the distorted and original images, for the four types of fisheye distortion:

$$\text{Equidistant: } R_{i,d} = \tan^{-1} \gamma_i R_{i,u}$$

$$\text{Orthographic: } R_{i,d} = \frac{\gamma_i R_{i,u}}{\sqrt{1 + \gamma_i R_{i,u}^2}}$$

$$\text{Stereographic: } R_{i,d} = \frac{2\left(\sqrt{\gamma_i R_{i,u}^2 + 1} - 1\right)}{\gamma_i R_{i,u}}$$

$$\text{Equisoid: } R_{i,d} = \frac{2\gamma_i R_{i,u}}{\sqrt{\gamma_i R_{i,u}^2 + 2}}$$

Where i is an axis, e.g., the X axis or the y axis, $R_{i,u}$ is the undistorted displacement along the i axis from the principle axis (the middle point in the image), and $R_{i,d}$ is the distorted displacement along the i axis from the principle axis. $\gamma_i$ is a dimensionless factor that controls the amount of distortion along the i axis, and is an independent parameter. A higher $\gamma_i$ implies a more severe distortion. Other distortion equations may be used.

According to embodiments of the invention, matching module 270 may compare simulated images 232 (including the distorted versions as required) to mask 262, to find the simulated image 232 that is the most similar to mask 262, or the simulated image 232 that provides the best fit with mask 262. According to some embodiments of the invention, matching module 270 may calculate a similarity metric or a loss function for each pair of simulated image 232 and mask 262, and select the simulated image 232 that provided the best similarity metric or loss function. In some embodiments intersection over union (IOU) is used as the similarity metric or loss function. IOU is a ratio of the number of pixels which are road-like in both the simulated image 232 and the mask 262, and the number of pixels which are road-like in either the simulated image 232 or the mask 262. An IOU of 1 means that the two completely agree and an IOU close to zero implies the simulated image and the mask are likely dissimilar. Other metrices or loss functions may be used such as the root mean squared error (RMSE), the structural similarity index measure (SSIM) or mutual information (MI). In some embodiments, rules may be used in addition to or in combination with the similarity metric or loss function. For example, the geographical data of the real road may include an indication of the driving direction on a road or a lane 120, which may be compared by matching module 270 with the motion vector derived by segmentation module 260. For example, if the driving direction as indicated in the geographical data of the real road matches the motion vector derived by segmentation module 260, it may provide a further indication that the simulated image 232 fits mask 262. However, if the driving direction as indicated in the geographical data of the real road does not match the motion vector derived by segmentation module 260, it may provide an indication that simulated image 232 does not fit mask 262. In another example, bounding box sizes and dimension (or an average thereof) captured by segmentation module 260 may provide an indication of the distance of the road from traffic camera 180, this may also be compared with the distance of simulated traffic camera 224 from simulated road 222 in simulated image 232 and may be used as indication whether simulated image 232 fit mask 262.

Thus, a plurality of simulated images 232 may be generated by simulated traffic camera 224, each with a different set of viewpoint parameters, and each of the simulated images 232 may be compared to mask 262, to find the best fit. Accordingly, matching module 270 may perform a search over the viewpoint parameters to find the set of viewpoint parameters that provide the best fit. In many applications, performing a brute force search, e.g., testing each and every combination of viewpoint parameters in a required resolution may take too long. In one implementation, a brute force approach is estimated to take decades on a single core machine (e.g., a single core processor). Therefore, a more efficient searching method is required.

According to embodiments of the invention, matching module 270 may reduce the number of tested sets of viewpoint parameters 240 by limiting the search space to a range of plausible and physically valid values of the viewpoint parameters 240. For example, the search may be limited to the ranges presented in Table 1. According to some embodiments, the ranges of plausible values may be based on various information sources including historical known viewpoints (e.g., viewpoints found for traffic camera 180 in previous iterations), metrics provided by traffic camera 180 itself, e.g., as metadata. For example, if traffic camera 180 provides values of tilt, pan and zoom (e.g., FOV), these values may be used as an initial guesses for the search and the search may be performed around those values. In addition, parameters that are constant for a specific traffic camera such as the height of the camera, the FOV (if the traffic camera does not have zooming capabilities), and the type of lens distortion may be determined once for traffic camera 180, and used in all subsequent iterations or calculations. In some embodiments, viewpoint parameters calculated in previous iterations (e.g., previous searches) may be used as starting point for a correct search, According to embodiments of the invention, matching module 270 may further reduce the number of tested sets of viewpoint parameters 240 by initially performing a brute force evaluation on a coarse grid for at least a subgroup of the viewpoint parameters 240, selecting a number of parameter value combinations that provided results in a predetermined percentile, e.g., top 10, 15 or 20 percentile, and searching in a finer grid around the selected parameter value combinations. For example, searching in a finer grid around the selected parameter value combinations may be performed using a numerical minimizer such as Nelder-Mead minimizer, which is a Downhill Simplex/Pattern Search minimizer. In some embodiments, the parameter values for the Nelder-Mead minimizer are bounded using the same boundaries set as in Table 1. Other possible solving algorithms for searching in a finer grid around the selected parameter value combinations may include Powell and Newton-CG.

By employing the above listed searching strategies, the minimization time may be reduced to a few minutes or less, depending on the quality of the initial guesses. FIG. 6 depicts a comparison of simulated images 232 and mask 260 as found by matching module 270, according to some embodiments of the invention. According to embodiments of the invention, it may be determined that the viewpoint parameters used for generating the simulated image 232 that provided the best similarity metric, are the real-world viewpoint parameters of camera 180. Thus, the viewpoint parameters 240 used for generating simulated image 232 that provided the best fit with mask 260 may form a viewpoint model, as those viewpoint parameters 240 specify the viewpoint of the traffic camera 180.

According to embodiments of the invention, viewpoint parameters 240 of the viewpoint model may be used by mapping module 280 to generate an association or mapping between pixel locations in subsequent images captured by traffic camera 180 and locations on the real road 120. The associations or mapping may be provided in a lookup table relating or associating each image pixel (x, y) with real world coordinates. In some embodiments, the real-world coordinates are defined as a distance (e.g., in meters) from traffic camera 180 in the east and north directions.

Figure 7:
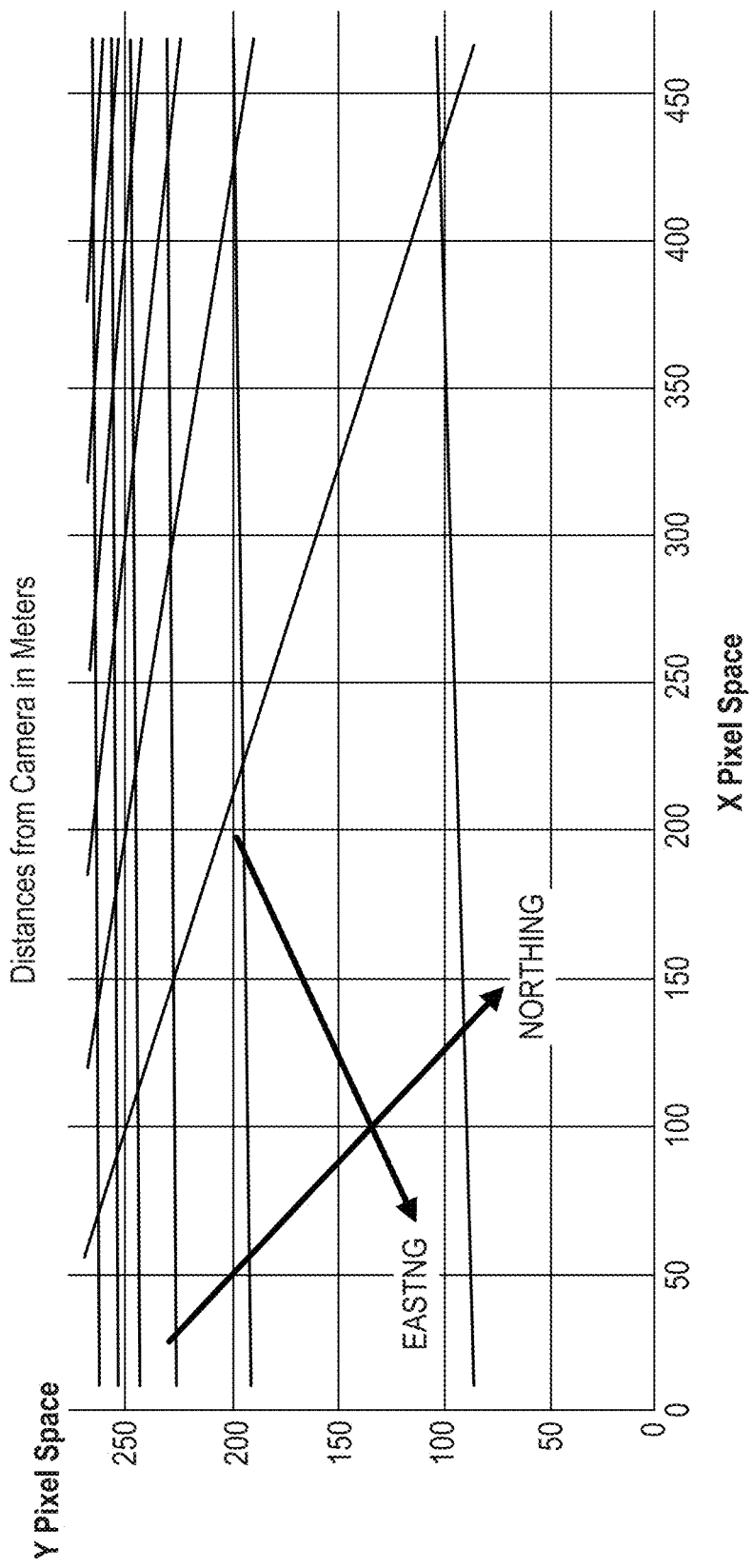
FIG. 7 depicts one representation of the lookup table, according to some embodiments of the invention.

According to embodiments of the invention, mapping module 280 may generate the mapping for a pixel location (x, y) in an image captured by traffic camera 180 by projecting the pixel forward in the 3D model of the road 222 until the projection intersects with a simulated ground plane, computing coordinates of the intersection and associating the coordinates of the intersection with the pixel. For example, projecting the pixel forward in the 3D model of the road 222 may be performed using the built-in ray tracing capability provided in Three.js. FIG. 7 depicts one representation of the lookup table, according to some embodiments of the invention. This representation may answer the question of where does a point in the image maps to in the physical road space. The lookup table relating or associating each image pixel (x, y) with real world coordinates may be further used to find the inverse relation, e.g., given a point on road 120, where is it on an image captured by traffic camera 180.

Obviously, the viewpoint model may only be valid for as long as traffic camera 180 is stationary. Thus, according to embodiments of the invention, the viewpoint model may have to be re-computed whenever traffic camera 180 moves (e.g., tilts, pans or zooms), intentionally, e.g., when that pan tilt or zoom settings of traffic camera 180 change or unintentionally. The re-computation may be triggered by a simple algorithm that thresholds on any sudden change in the background. The background may be extracted using a rolling median of the video frames. The rolling median window may be tuned to about 15 seconds and effectively separates out the background from foreground moving objects such as vehicles. Any sudden changes to this background rolling median may imply the background has changed substantially, likely due to the camera being moved. It is at this point that a viewpoint re-computation may be triggered. Additionally or alternatively, the part of generating mask 262 may be repeated periodically, and a current mask 262 may be matched to the simulated road, if the similarity metric or loss function changes substantially, a full re-calculation may be triggered.

Figure 8:
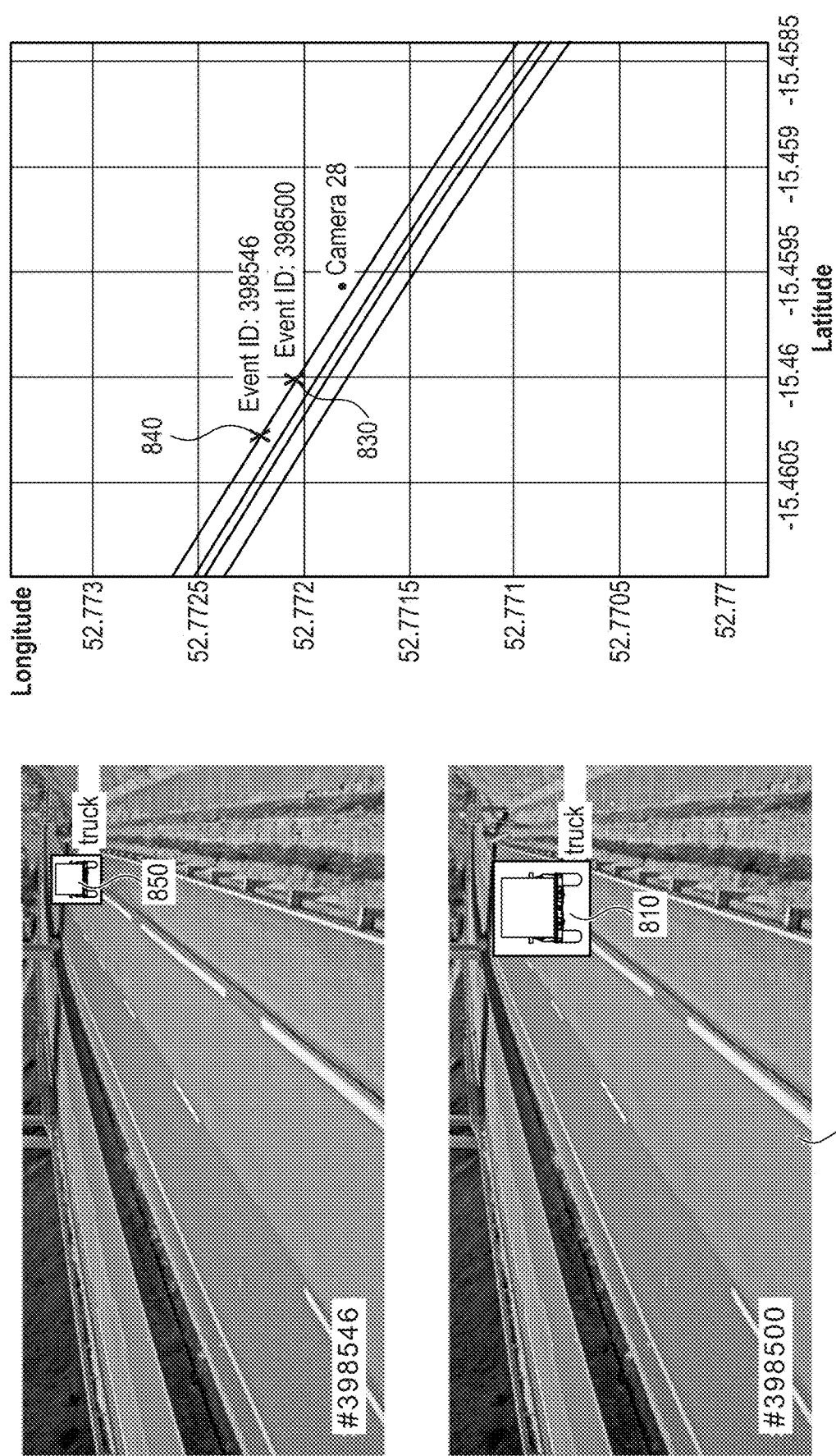
FIG. 8 depicts a real-world location of an object detected in an image captured by a traffic camera, according to some embodiments of the invention.
Figure 9:
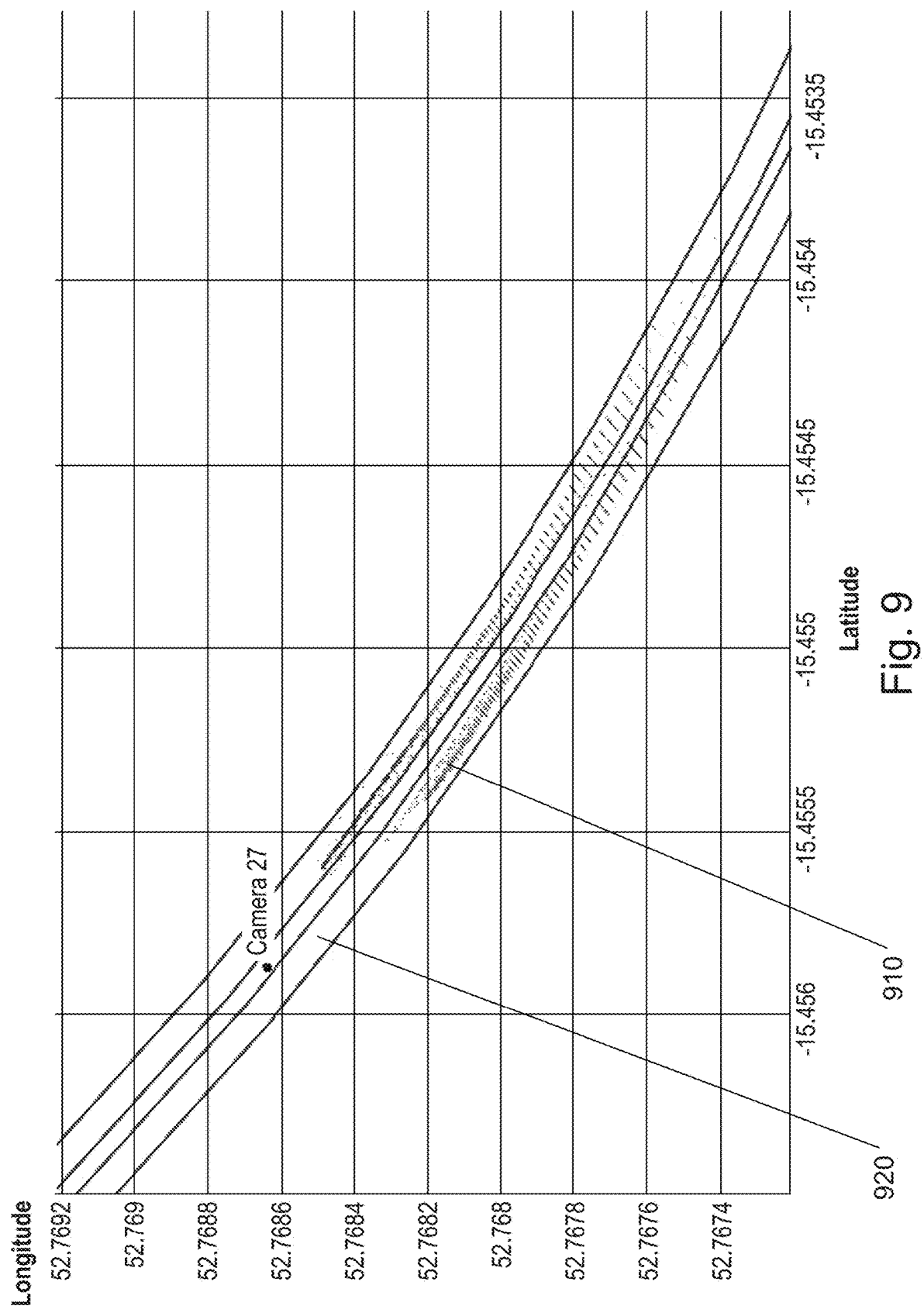
FIG. 9 depicts a trajectory on the 3D model of a road, of a vehicle detected in consecutive images captured by a traffic camera, according to some embodiments of the invention.
Figure 10:
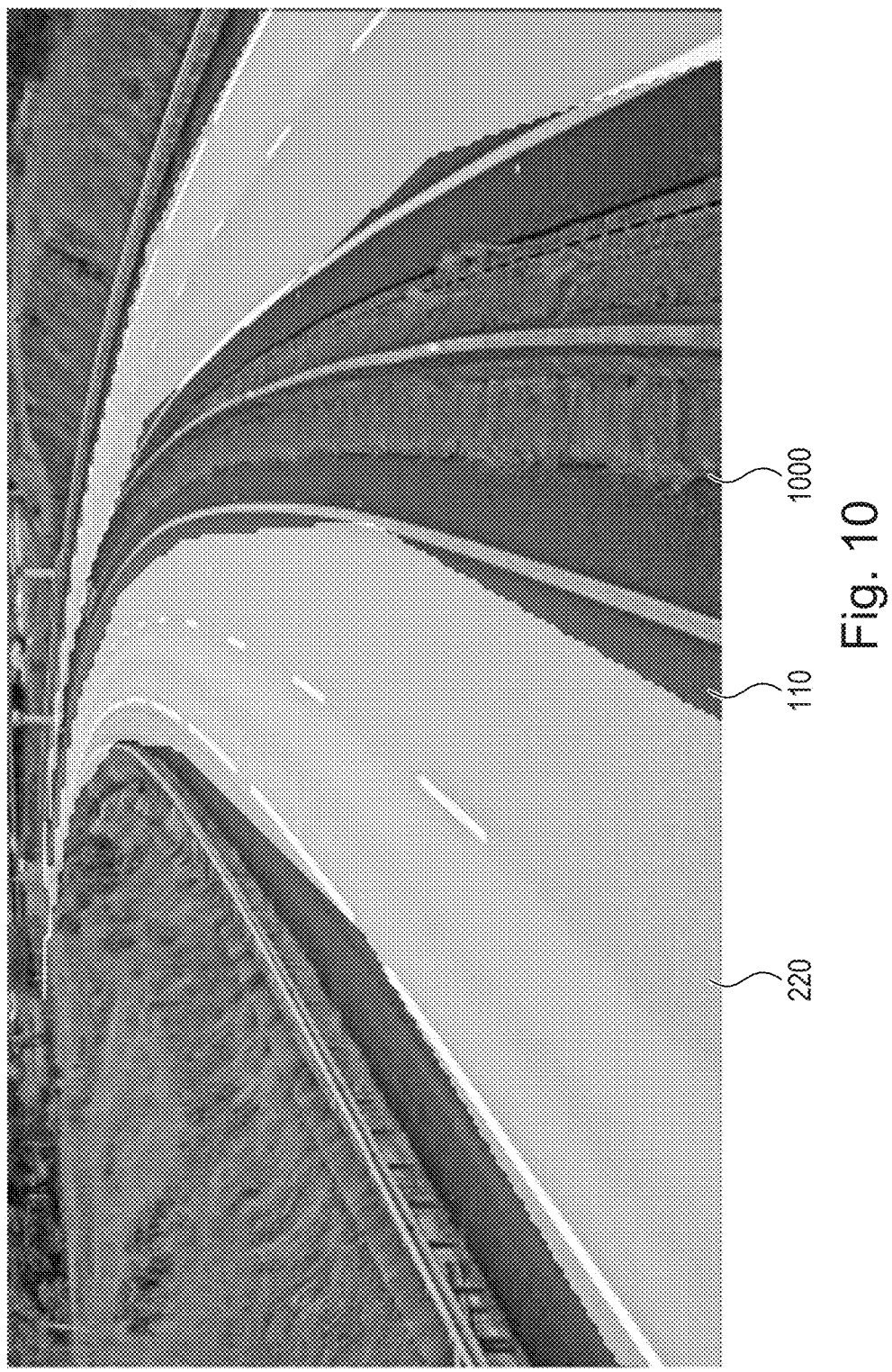
FIG. 10 depicts an overlay of the 3D model of a road on a real-world image of the road, according to some embodiments of the invention.

According to embodiments of the invention, mapping module 280 may use the mapping between pixel locations in images captured by traffic camera 180 and locations on the real road 120 to determine a real-world location of incidents detected in images captured by traffic camera 180, e.g., by image analysis algorithms or vision-based incident detection algorithms. FIG. 8 depicts a real-world location 830 of an object 810 detected in image 820 captured by traffic camera 180, according to some embodiments of the invention. In addition, mapping module 280 may use the mapping between locations on the real road 120 and pixel locations in images captured by traffic camera 180 to determine a location 850 in an image 820 captured by traffic camera 180 of an object 840 in the real world. Mapping module 280 may use the mapping between pixel locations in images captured by traffic camera 180 and locations on the real road 120 to generate and present, on the 3D model, a trajectory of a vehicle detected in consecutive images captured by traffic camera 180. FIG. 9 depicts a trajectory 910 on the 3D model of a road 920 of a vehicle detected in consecutive images captured by traffic camera 180, according to some embodiments of the invention. Mapping module 280 may further use the mapping between pixel locations in images captured by traffic camera 180 and locations on the real road 120 to generate an overlay of objects from the 3D model of road 220, e.g., the geometry of the road or markers of exits, on real world images captured by traffic camera 180. FIG. 10 depicts an overlay of the 3D model of road 220 on real world image 1000 of road 120, according to some embodiments of the invention.

Figure 11:
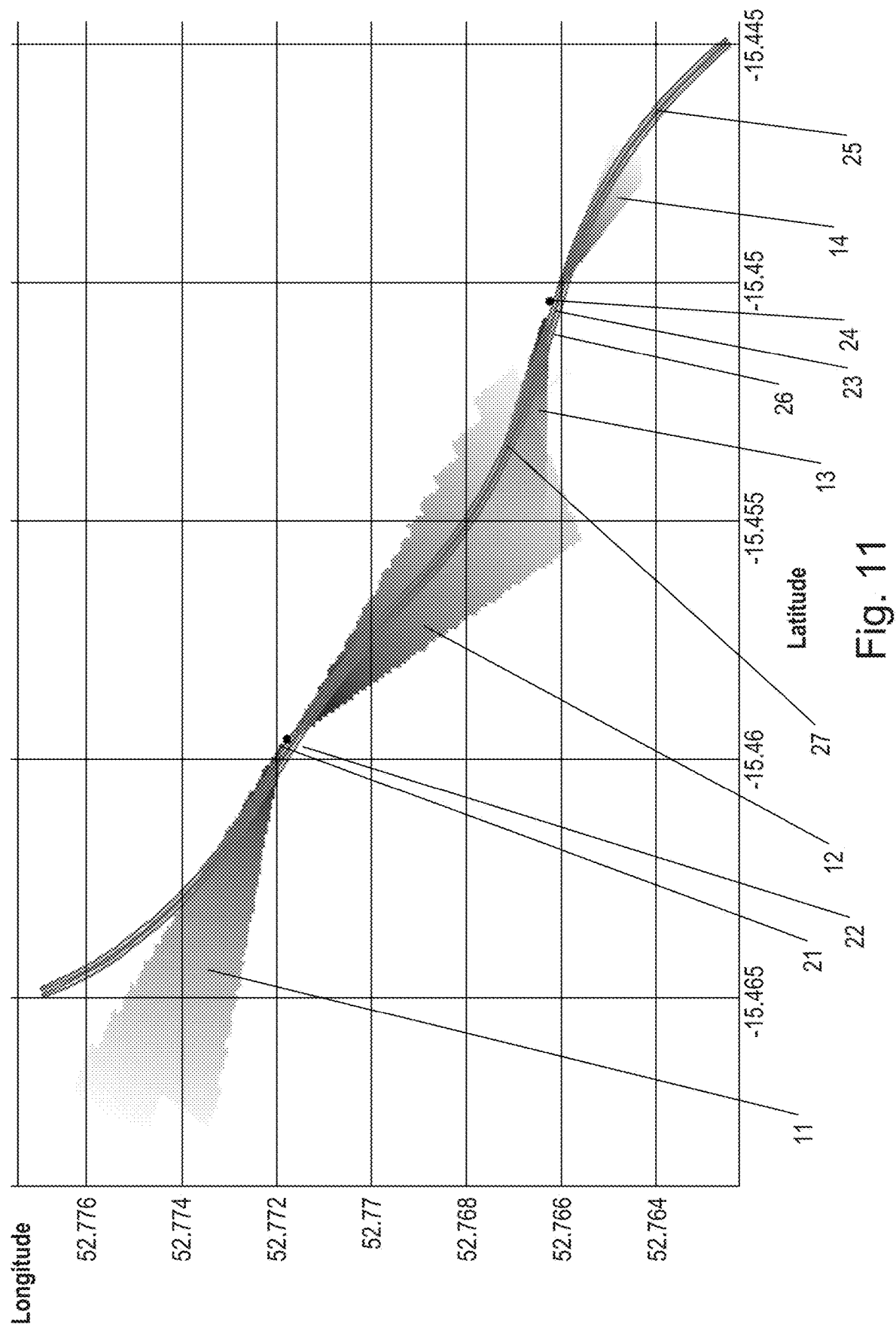
FIG. 11 depicts areas, covered by four cameras, according to some embodiments of the invention.

According to embodiments of the invention, mapping module 280 may use the mapping between pixel locations in images captured by traffic camera 180 and locations on the real road 120 to quantitatively determine the coverage of traffic camera 180. The coverage may be determined, for example, by placing all the real-world locations of pixels in images captured by a traffic camera in the 3D model. Using the coverage data, mapping module 280 may determine whether an incident in a known real-world location can be seen from one or more traffic cameras 180 and/or 182. If the incident is covered by multiple cameras, e.g., both traffic camera 180 and traffic camera 182, then mapping module 280 may determine which camera may resolve the incident location best or provide the best view of the incident. For example, mapping module 280 may estimate the relative resolution of each of traffic cameras 180 and 182 that cover the incident, e.g., by the relative density of intersected traced ray per unit area emitted uniformly from the traffic camera, and select the camera that provides the highest relative resolution. Mapping module 280 may further consider the line of signet between traffic cameras 180 and 182 and the incident as well as other considerations. Mapping module 280 may use coverage information to simulate what is the best place to install new cameras to maximize coverage for example, by examining what are the existing blind spots in camera coverage. FIG. 11 depicts areas 11, 12, 13 and 14, covered by four cameras 22, 23, 24 and 25, respectively, according to some embodiments of the invention. Areas 11, 12, 13 and 14 may be located on a stretch of a highway 25, indicating blind spots 26 and regions where cameras overlap, e.g., region 27 where areas 12 and 13 covered by four cameras 22 and 23 overlap.

Figure 12:
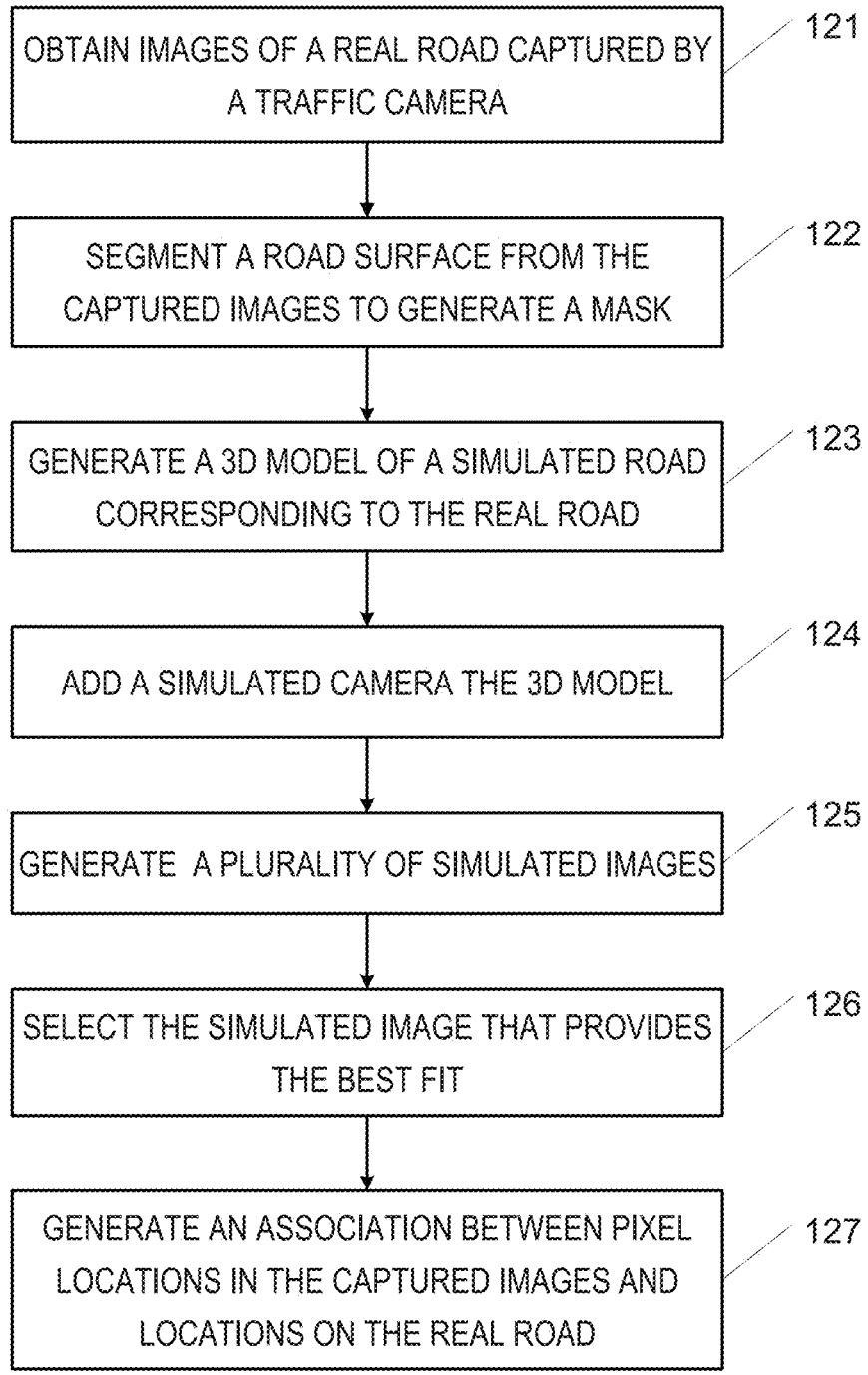
FIG. 12 shows a flowchart of a method for determining a viewpoint of a traffic camera, according to some embodiments of the present invention.

Reference is now made to FIG. 12 which shows a flowchart of a method for determining a viewpoint of a traffic camera, according to some embodiments of the present invention. The operations of FIG. 9 may be performed by the systems described in FIGS. 1, 2 and 13, but other systems may be used.

In operation 121, a processor, e.g., processor 705 may obtain images, e.g., a video stream, of a real road, e.g., road 120 captured by traffic camera, e.g., traffic camera 180. In operation 121, the processor may segment a road surface from the captured images to generate a mask, e.g., mask 262 of the real road. For example, the processor may segment the road surface by using an object detector to detect vehicles in the captured images, estimate positions in the captured images where the detected vehicles touch the real road and possibly other parameters such as directions of travel, the class of the vehicle, the size of the vehicle, etc., accumulate the positions and the other parameters if applicable over time, and determine a segments of the real road on the captured images based on the accumulated positions and possibly based on the other parameters.

In operation 123, the processor may generate a 3D model of a simulated road, e.g., model 222, corresponding to the real road, from map data of the real road. In operation 124, the processor may add a simulated camera, e.g., simulated camera 224, corresponding to the traffic camera to a location in the 3D model that is corresponding to a location of the traffic camera in the real road. In operation 125, the processor may generate a plurality of simulated images, e.g., simulated images 232 of the simulated road using the 3D model, where each of the plurality of simulated images may correspond to a set of viewpoint parameters of the simulated traffic camera. The viewpoint parameters may include at least one of a field of view (FOV), height, pan, tilt, roll, lens distortion in direction X, or lens distortion in direction Y and a type of lens distortion. The processor may generate a plurality of simulated images corresponding to different types of lens distortion by applying each type of a simulated lens distortion on the simulated image prior to performing the fitting and selecting the type of lens distortion that provides the best fit.

In operation 126, the processor may fit each of the simulated images with the mask and select the simulated image that provides the best fit between the simulated image and the mask. For example, the processor may select the simulated image that provides a minimal loss function between the simulated image and the mask. The processor may perform a search over the sets of plausible viewpoint parameters by limiting the search space to a range of plausible values of the viewpoint parameters, performing a brute force evaluation on a coarse grid for at least a subgroup of the viewpoint parameters, selecting a number of parameter value combinations that provided results in a predetermined percentile, and searching in a finer grid around the selected parameter value combinations. In operation 127, the processor may generate mapping or an association between pixel locations in the captured images and locations on the real road. For example, the processor may generate the mapping by projecting the pixel forward in the 3D model until the projection intersects with a simulated ground plane and computing coordinates of the intersection and associating the coordinates of the intersection with the pixel. The mapping may be used for performing each of determining a real-world location of an object depicted in an image captured by the traffic camera, determining a location in an image captured by the traffic camera of an object in the real world, generating and presenting, on the 3D model, a trajectory of a vehicle detected in consecutive images captured by the traffic camera, determining coverage of the traffic camera, determining a location in an image captured by the traffic camera of an object captured in an image of a second traffic camera, and projecting live video captured by the traffic camera on a map of the real road so that coordinate systems of the live video and the map are aligned.

According to embodiments of the invention, the processor may repeat operations 121-127 for a plurality of traffic cameras, determine coverage of the plurality of traffic cameras and select a camera from the plurality of traffic cameras that provides the best resolution for a point of interest. The processor may further simulate an optimal location for a new traffic camera that would maximize coverage.

Reference is made to FIG. 13, showing a high-level block diagram of an exemplary computing device according to some embodiments of the present invention. Computing device 700 may include a processor 705 that may be, for example, a central processing unit processor (CPU) or any other suitable multi-purpose or specific processors or controllers, a chip or any suitable computing or computational device, an operating system 715, a memory 120, executable code 725, a storage system 730, input devices 735 and output devices 740. Processor 705 (or one or more controllers or processors, possibly across multiple units or devices) may be configured to carry out methods described herein, and/or to execute or act as the various modules, units, etc. for example when executing code 725. More than one computing device 700 may be included in, and one or more computing devices 700 may be, or act as the components of, a system according to embodiments of the invention. Various components, computers, and modules of FIGS. 1 and 2, may include devices such as computing device 700, and one or more devices such as computing device 700 may carry out functions such as those described in FIG. 12. For example, traffic control server 130 may be implemented on or executed by a computing device 700.

Operating system 715 may be or may include any code segment (e.g., one similar to executable code 725) designed and/or configured to perform tasks involving coordination, scheduling, arbitration, controlling or otherwise managing operation of computing device 700, for example, scheduling execution of software programs or enabling software programs or other modules or units to communicate.

Memory 720 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short-term memory unit, a long term memory unit, or other suitable memory or storage units. Memory 720 may be or may include a plurality of, possibly different memory units. Memory 720 may be a computer or processor non-transitory readable medium, or a computer non-transitory storage medium, e.g., a RAM.

Executable code 725 may be any executable code, e.g., an application, a program, a process, task or script. Executable code 725 may be executed by processor 705 possibly under control of operating system 715. For example, executable code 725 may configure processor 705 to determine a viewpoint of a traffic camera, and perform other methods as described herein. Although, for the sake of clarity, a single item of executable code 725 is shown in FIG. 13, a system according to some embodiments of the invention may include a plurality of executable code segments similar to executable code 725 that may be loaded into memory 720 and cause processor 705 to carry out methods described herein.

Storage system 730 may be or may include, for example, a hard disk drive, a CD-Recordable (CD-R) drive, a Blu-ray disk (BD), a universal serial bus (USB) device or other suitable removable and/or fixed storage unit. Data such as the measured velocities as well as other data required for performing embodiments of the invention, may be stored in storage system 730 and may be loaded from storage system 730 into memory 720 where it may be processed by processor 705. Some of the components shown in FIG. 13 may be omitted. For example, memory 720 may be a non-volatile memory having the storage capacity of storage system 730. Accordingly, although shown as a separate component, storage system 730 may be embedded or included in memory 720.

Input devices 735 may be or may include a mouse, a keyboard, a microphone, a touch screen or pad or any suitable input device. Any suitable number of input devices may be operatively connected to computing device 700 as shown by block 735. Output devices 740 may include one or more displays or monitors, speakers and/or any other suitable output devices. Any suitable number of output devices may be operatively connected to computing device 700 as shown by block 740. Any applicable input/output (I/O) devices may be connected to computing device 700 as shown by blocks 735 and 740. For example, a wired or wireless network interface card (NIC), a printer, a universal serial bus (USB) device or external hard drive may be included in input devices 735 and/or output devices 740.

In some embodiments, device 700 may include or may be, for example, a personal computer, a desktop computer, a laptop computer, a workstation, a server computer, a network device, a smartphone or any other suitable computing device. A system as described herein may include one or more devices such as computing device 700. Device 700 or parts thereof may be implemented in a remote location, e.g., in a 'cloud' computing system.

When discussed herein, "a" computer processor performing functions may mean one computer processor performing the functions or multiple computer processors or modules performing the functions; for example, a process as described herein may be performed by one or more processors, possibly in different locations.

In the description and claims of the present application, each of the verbs, "comprise", "include" and "have", and conjugates thereof, are used to indicate that the object or objects of the verb are not necessarily a complete listing of components, elements or parts of the subject or subjects of the verb. Unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of an embodiment as described. In addition, the word "or" is considered to be the inclusive "or" rather than the exclusive or, and indicates at least one of, or any combination of items it conjoins.

Descriptions of embodiments of the invention in the present application are provided by way of example and are not intended to limit the scope of the invention. The described embodiments comprise different features, not all of which are required in all embodiments. Embodiments comprising different combinations of features noted in the described embodiments, will occur to a person having ordinary skill in the art. Some elements described with respect to one embodiment may be combined with features or elements described with respect to other embodiments. The scope of the invention is limited only by the claims.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

The invention claimed is:

1. A method for determining a viewpoint of a traffic camera, the method comprising:
    obtaining, by a processor, images of a real road captured by the traffic camera;
    segmenting, by the processor, a road surface from the captured images to generate a mask of the real road;
    generating, by the processor, a three-dimensional (3D) model of a simulated road corresponding to the real road, from geographical data of the real road;
    adding, by the processor, a simulated camera corresponding to the traffic camera to a location in the 3D model that is corresponding to a location of the traffic camera in the real road;
    generating, by the processor, a plurality of simulated images of the simulated road using the 3D model, wherein each of the plurality of simulated images corresponds to a set of viewpoint parameters of the simulated traffic camera;
    selecting, by the processor, the simulated image that provides the best fit between the simulated image and the mask;
    generating, by the processor, mapping between pixel locations in the captured images and locations on the real road;
    repeating generating the mapping for a plurality of traffic cameras;
    determining coverage of the plurality of traffic cameras; and
    selecting a camera from the plurality of traffic cameras that provides the best view of a point of interest.

2. The method of claim 1, wherein the viewpoint parameters comprise at least one of field of view (FOV), height, pan, tilt, roll, lens distortion in direction X, lens distortion in direction Y, or a type of lens distortion.

3. The method of claim 1, wherein fitting the simulated image of the plurality of simulated images with the mask comprises:
    selecting the simulated image that provides a minimal loss function between the simulated image and the mask.

4. The method of claim 3, wherein minimizing the loss function comprises:
    limiting the search space to a range of plausible values of the viewpoint parameters;
    performing a brute force evaluation on a coarse grid for at least a subgroup of the viewpoint parameters;
    selecting a number of parameter value combinations that provided results in a predetermined percentile; and
    searching in a finer grid around the selected parameter value combinations.

5. The method of claim 1, wherein segmenting the road surface comprises:
    using an object detector to detect vehicles in the captured images;
    estimating positions in the captured images where the detected vehicles touch the real road;
    accumulating the positions over time; and determining the segments of the real road on the captured images based on the accumulated positions.

6. The method of claim 1, comprising correcting lens distortion by:
applying at least one type of a simulated lens distortion on the simulated image prior to performing the fitting; and
selecting the type of lens distortion that provides the best fit.

7. The method of claim 1, wherein generating the mapping for a pixel location comprises:
projecting the pixel forward in the 3D model until the projection intersects with a simulated ground plane; and
computing coordinates of the intersection and associating the coordinates of the intersection with the pixel.

8. The method of claim 1, comprising using the mapping to perform at least one of:
determining a real-world location of an object depicted in an image captured by the traffic camera;
determining a location in an image captured by the traffic camera of an object in the real world;
generating and presenting, on the 3D model, a trajectory of a vehicle detected in consecutive images captured by the traffic camera;
determining coverage of the traffic camera;
determining a location in an image captured by the traffic camera of an object captured in an image of a second traffic camera; and
projecting live video captured by the traffic camera on a map of the real road so that coordinate systems of the live video and the map are aligned.

9. The method of claim 1, comprising:
simulating an optimal location for a new traffic camera that would maximize coverage.

10. A system for determining a viewpoint of a traffic camera, the system comprising:
a memory; and
a processor configured to:
obtain images of a real road captured by the traffic camera;
segment a road surface from the captured images to generate a mask of the real road;
generate a three-dimensional (3D) model of a simulated road corresponding to the real road, from geographical data of the real road;
add a simulated camera corresponding to the traffic camera to a location in the 3D model that is corresponding to a location of the traffic camera in the real road;
generate a plurality of simulated images of the simulated road using the 3D model, wherein each of the plurality of simulated images corresponds to a set of viewpoint parameters of the simulated traffic camera;
select the simulated image that provides the best fit between the simulated image and the mask;
generate mapping between pixel locations in the captured images and locations on the real road:
repeat generating the mapping for a plurality of traffic cameras;
determine coverage of the plurality of traffic cameras; and
select a camera from the plurality of traffic cameras that provides the best view of a point of interest.

11. The system of claim 10, wherein the viewpoint parameters comprise at least one of field of view (FOV), height, pan, tilt, roll, lens distortion in direction X, lens distortion in direction Y, or a type of lens distortion.

12. The system of claim 10, wherein the processor is configured to fit the simulated image of the plurality of simulated images with the mask by:
selecting the simulated image that provides a minimal loss function between the simulated image and the mask.

13. The system of claim 12, wherein the processor is configured to minimize the loss function by:
limiting the search space to a range of plausible values of the viewpoint parameters;
performing a brute force evaluation on a coarse grid for at least a subgroup of the viewpoint parameters;
selecting a number of parameter value combinations that provided results in a predetermined percentile; and
searching in a finer grid around the selected parameter value combinations.

14. The system of claim 10, wherein the processor is configured to segment the road surface by:
using an object detector to detect vehicles in the captured images;
estimating positions in the captured images where the detected vehicles touch the real road;
accumulating the positions over time; and
determining the segments of the real road on the captured images based on the accumulated positions.

15. The system of claim 10, wherein the processor is further configured to correct lens distortion by:
applying at least one type of a simulated lens distortion on the simulated image prior to performing the fitting; and
selecting the type of lens distortion that provides the best fit.

16. The system of claim 10, wherein the processor is configured to generate the mapping for a pixel location by:
projecting the pixel forward in the 3D model until the projection intersects with a simulated ground plane; and
computing coordinates of the intersection and associating the coordinates of the intersection with the pixel.

17. The system of claim 10, wherein the processor is further configured to use the mapping to perform at least one of:
determine a real-world location of an object depicted in an image captured by the traffic camera;
determine a location in an image captured by the traffic camera of an object in the real world;
generate and presenting, on the 3D model, a trajectory of a vehicle detected in consecutive images captured by the traffic camera;
determine coverage of the traffic camera;
determine a location in an image captured by the traffic camera of an object captured in an image of a second traffic camera; and
project live video captured by the traffic camera on a map of the real road so that coordinate systems of the live video and the map are aligned.

18. The system of claim 10, wherein the traffic camera is selected from the list consisting of: a static camera, a pan-tilt-zoom (PTZ) camera, a panoramic camera or a thermal camera.

19. The system of claim 10, wherein the processor is further configured to simulate an optimal location for a new traffic camera that would maximize coverage.

* * * * *